United States Patent [19]

Tagomori et al.

[11] Patent Number: 4,601,611
[45] Date of Patent: Jul. 22, 1986

[54] MARINE FENDER

[75] Inventors: Satoshi Tagomori, Yokohama; Hisaya Uruta, Tokyo, both of Japan

[73] Assignee: Bridgestone Corporation, Tokyo, Japan

[21] Appl. No.: 629,382

[22] Filed: Jul. 10, 1984

[30] Foreign Application Priority Data

Aug. 22, 1983 [JP] Japan .................................. 58-151485

[51] Int. Cl.$^4$ ........................... E02B 3/22; B63B 59/02
[52] U.S. Cl. ..................................... 405/215; 114/219; 267/140
[58] Field of Search ........................ 405/211, 212, 215; 267/140, 153, 141; 114/219

[56] References Cited

U.S. PATENT DOCUMENTS

| 3,600,896 | 8/1971 | Tateisi et al. ........................ 405/215 |
| 4,258,641 | 3/1981 | Wakamiya ........................ 405/215 X |
| 4,319,539 | 3/1982 | Fujii et al. ........................ 405/215 X |
| 4,355,792 | 10/1982 | Fukuda et al. ................... 405/215 X |

FOREIGN PATENT DOCUMENTS

| 2635571 | 2/1977 | Fed. Rep. of Germany ...... 405/215 |
| 2837701 | 3/1979 | Fed. Rep. of Germany ...... 405/215 |
| 2388947 | 11/1978 | France . |
| 2441683 | 6/1980 | France . |
| 2492930 | 4/1982 | France . |
| 2523611 | 9/1983 | France . |
| 2088523 | 6/1982 | United Kingdom ................ 405/212 |

Primary Examiner—Cornelius J. Husar
Assistant Examiner—Nancy J. Stodola
Attorney, Agent, or Firm—Sughrue, Mion, Zinn, Macpeak, and Seas

[57] ABSTRACT

A marine fender comprising a hollow tapered body of an elastic material, either small-diameter side or large-diameter side of which being a shock-receiving side and the other being a fastening side is disclosed. In this marine fender, the thickness of the hollow tapered body is gradually thickened from the large-diameter side toward the small-diameter side, and the hollow tapered body is provided at the outer periphery with a groove formed at a given position near the shock-receiving side end, and has a truncated pyramidal form at either the inner surface or the outer surface or both surfaces thereof.

10 Claims, 15 Drawing Figures

FIG_3
PRIOR ART
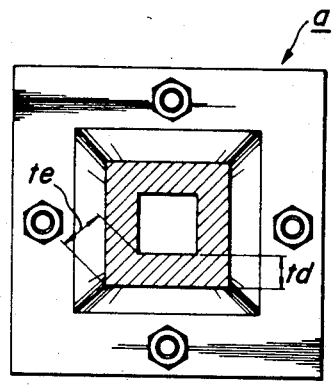
FIG_4
PRIOR ART
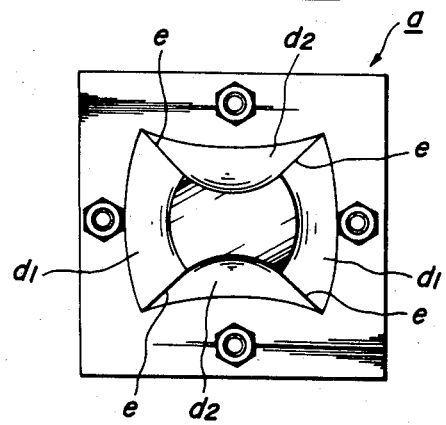

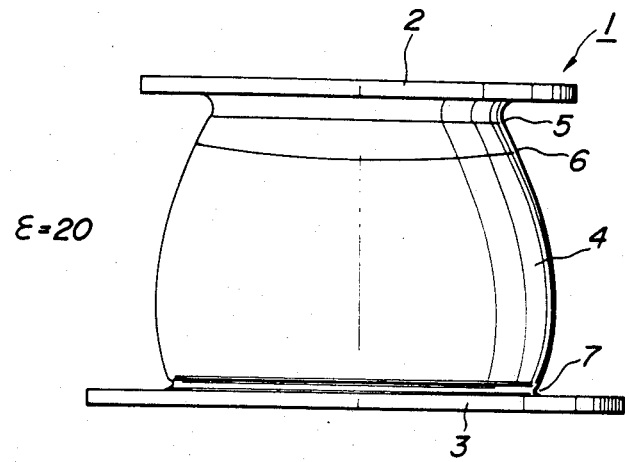
FIG_7C
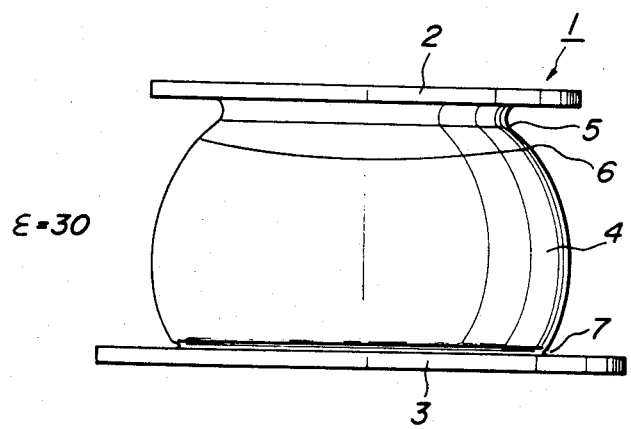
FIG_7D $\varepsilon = 40$ $\varepsilon = 50$ $\varepsilon = 55$

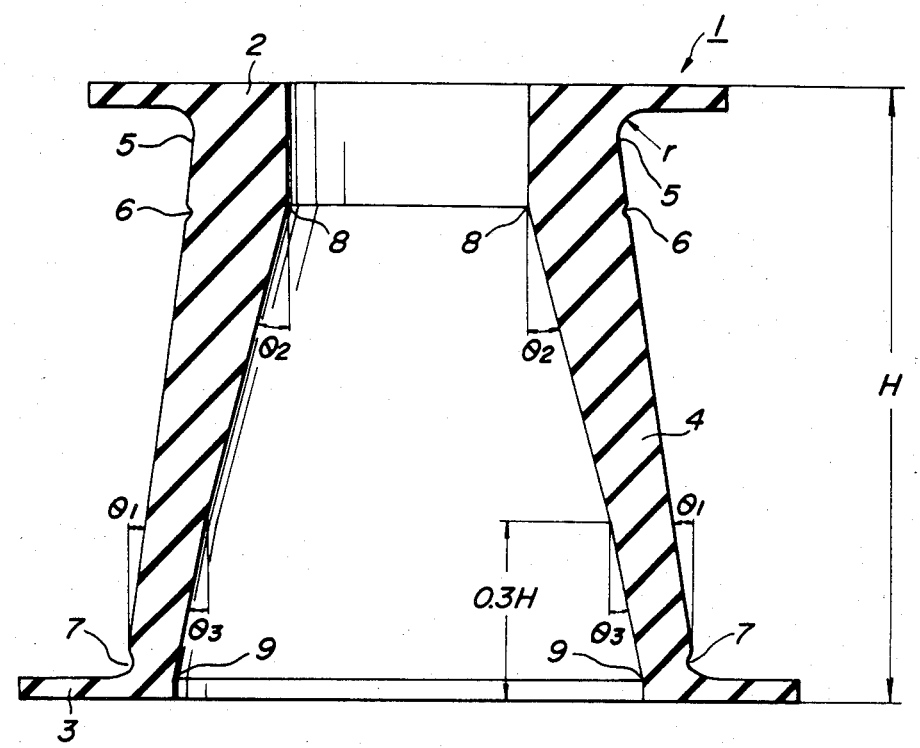
FIG_8

4,601,611

MARINE FENDER

BACKGROUND OF THE INVENTION

1. Field of the Invention

This invention relates to a marine fender for buffering shocks to vessels and offshore structures in harbors or on the sea.

2. Description of the Prior Art

In the conventional marine fender a, as shown in FIGS. 1 to 4, a shock receiving portion b of a square plate type is integrally united at the outer periphery with an upper peripheral edge of a support portion c of a hollow pyramid frustum, and this support portion c has an approximately equal thickness and a certain slant as shown in FIG. 2.

In berthing the vessel, therefore, the dynamic phenomenon of the marine fender a applied to compressive force is as follows.

When the thicknesses of the support flat portion d and the support corner portion e are td and te, respectively, as shown in FIG. 3, geometrical moments of inertia Id and Ie in the portions d and e are proportional to the cubes of the thicknesses td and te, respectively.

Now, when the compressive force P is applied to the marine fender a, if the compressive force P is relatively small, both the shock receiving portion b and the support portion c cause an elastic deformation, while if the compressive force P is large and exceeds a buckling load, the support portion c causes a buckling deformation. Moreover, the buckling load Pc is represented by the following equation:

$$Pc = k(EI/l^2) \tag{1}$$

wherein k is a proportionality factor, l is a longitudinal overall length of the support portion and E is an elastic coefficient, and hence is proportional to the geometrical moment of inertia I. On the other hand, the relation between the thickness td of the support flat portion and the thickness te of the support corner portion is te>td as apparent from FIG. 3, so that the geometrical moment of inertia is Ie>>Id. As a result, the support corner portion e does not materially cause buckling deformation as compared with the support flat portion d. That is, only the support flat portion d causes the buckling deformation.

In case of causing the buckling deformation, the support corner portion e retains a right angle between the adjoining support flat portions because of the resistance to bending deformation along a plane parallel with the shock receiving surface or the bending rigidity in a direction parallel with the shock receiving surface. As shown in FIG. 4, therefore, the opposed support flat portions $d_1$ bulge outward, while the opposed support flat portions $d_2$ dent inward. That is, the support corner portion e having a large buckling load can not a great influence on the resistance causing no buckling of the support portion c as a whole, so that the conventional marine fender a rapidly changes from a compression elastic deformation region having a high reaction force into a buckling deformation region having a low reaction force, whereby the shock absorbing energy against the vessel becomes reduced.

SUMMARY OF THE INVENTION

It is, therefore, an object of the invention to eliminate the aforementioned drawbacks of the prior art and to provide a marine fender having a simple structure and a large shock absorbing energy based on a stable deformation.

According to the invention, there is the provision of in a marine fender comprising a hollow tapered body of an elastic material having a relatively small modulus coefficient, either small-diameter side or large-diameter side of which being a shock-receiving side and the other being a fastening side, the improvement wherein the thickness of the hollow tapered body is gradually thickened from the large-diameter side toward the small-diameter side, and the hollow tapered body is provided at the outer periphery with a groove formed at a given position near the shock-receiving side end, and has a truncated pyramidal form at either the inner surface or the outer surface or both surface thereof.

In the preferred embodiment of the invention, the elastic material is rubber, and the hollow tapered body has a truncated conical form at the inner surface and a truncated pyramidal form at the outer surface.

BRIEF DESCRIPTION OF THE DRAWING

The invention will now be described with reference to the accompanying drawing, wherein:

FIG. 3 is a transversely plan view taken along a line III—III of FIG. 2;

FIG. 4 is a plan view illustrating the compressed state of FIG. 1;

FIGS. 7A to 7G are schematic views illustrating the change of compressed state of the marine fender shown in FIG. 5, respectively; and FIGS. 8 and 9 are longitudinally sectional views of the other embodiments of the marine fender according to the invention, respectively.

DETAILED DESCRIPTION OF THE INVENTION

Figure 1:
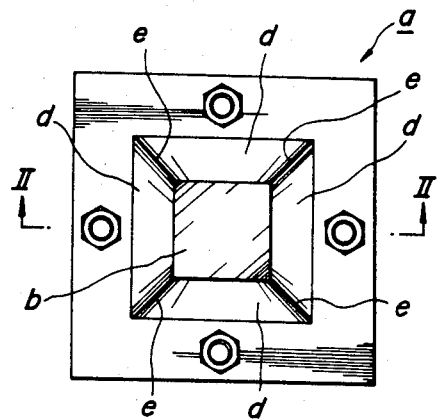
FIG. 1 is a paln view of the conventional marine fender as previously mentioned.
Figure 2:
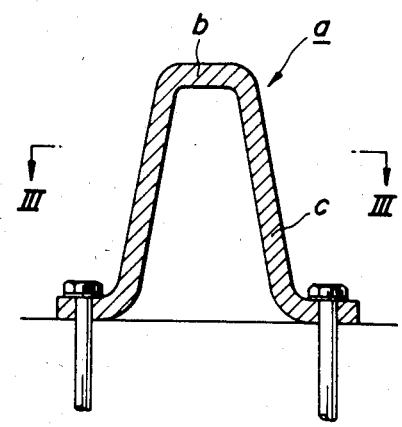
FIG. 2 is a longitudinally sectional view taken along a line II—II of FIG. 1.

According to the invention, the thickness of the hollow tapered body composed of an elastic material having a relatively small modulus coefficient such as rubber or the like is gradually thickened from a small-diameter side toward a large-diameter side, provided that either the small-diameter side or the large-diameter side is a shock-receiving side and the other is a fastening side. In this case, a compressive reaction force per unit compression deformation in the whole of the marine fender or a so-called compressive spring constant is small when the compressive force is small, and may be made large as the compressive force increases. Therefore, shocks can softly be absorbed at an initial shock-buffering stage, and also the shock-buffering force can gradually be made large as the shock increases.

In the marine fender according to the invention, the groove is formed on the outer periphery of the hollow tapered body at a given position near the shock-receiving side end. As a result, the distance from the groove to the shock-receiving side end is considerably shorter when compared with the longitudinal overall length of the hollow tapered body, so that the buckling load of the hollow tapered body provided with the groove is considerably larger than that of the hollow tapered body containing no groove as apparent from the aforementioned equation (1). This means that the buckling reaction force (or a force against the buckling load) is large, and contributes to increase the shock absorbing energy.

Further, either the inner surface or the outer surface or both of the hollow tapered body has a truncated pyramidal form, so that when the compressive force is applied to the marine fender, the whole surface of the pyramid is bulged outward to produce a large displacement of the marine fender and consequently the buffering performance becomes excellent. Particularly, when the hollow tapered body has a truncated conical from at the inner surface and a truncated pyramidal form at the outer surface, the thickness of the hollow tapered body is approximately uniform in the pheripheral direction and is gradually changed in the longitudinal axis direction, so that the geometrical moment of inertia I in the hollow tapered body slowly changes without causing a lagely local change. In berthing the vessel, therefore, the marine fender gradually shifts from a compression elastic deformation region having a high reaction force into a buckling deformation region having a low reaction force through an elastic-buckling transition deformation region having a relatively high reaction force, and consequently the shock absorbing energy against the vessel becomes larger. Morover, since the thickness of the hollow tapered body is gradually changed in the longitudinal axis direction as mentioned above, the stress distribution is slowly changed to prevent the stress concentration, and consequently the durability against fatigue is improved and the directional property of the stress concentration is reduced.

The invention will be described with respect to an example shown in FIGS. 5 to 7.

In these figures, numeral 1 is a marine fender comprising a hollow tapered body of a rubber elastomer. The marine fender 1 comprises a shock-receiving portion 2, a fastening portion 3 in parallel with the shock-receiving portion 2, and a support portion 4 extending from the fastening portion 3 to the shock-receiving portion 2 in a tapered form. As shown in FIGS. 5 and 6, the support portion 4 is hollow in the inside and has a truncated octapyramidal form at the outer surface and a truncated conical form at the inner surface.

That is, when a height between the bottom surface of the fastening portion 3 and the upper surface of the shock-receiving portion 2 is H, the outer surface of the marine fender 1 is shaped into the truncated octapyramidal form over a distance extending from the fastening portion 3 to a shock-receiving base 5 (which is located in approximately 0.1H from the upper surface of the shock-receiving portion 2), which is inclined inward at an angle $\theta_1$ of $9°±2°$ with respect to a normal line, and extends vertically from the shock-receiving base 5 to the upper surface of the shock-receiving portion 2. Further, an upper groove 6 of a semicircle in section having a radius of about 0.01–0.015H is formed on the outer surface of the marine fender 1 over its whole periphery at a position of 0.2H from the upper surface of the shock-receiving portion 2, while a lower groove 7 having substantially the same form and size as the upper groove 6 is formed on the outer surface of the marine fender 1 at a position of about 0.1H from the bottom surface of the fastening portion 3.

On the other hand, the inner surface of the marine fender 1 is shaped into cylindrical forms between the upper surface of the shock-receiving portion 2 and a shock-receiving lower end 8 located in 0.2H therefrom and between the bottom surface of the fastening portion 3 and a fastening upper end 9 located in 0.035H therefrom, and into the truncated conical form inclined inward at an angle $\theta_2$ of $12.5°±2.5°$ with respect to a normal line between the fastening upper end 9 and the shock-receiving lower end 8.

In the marine fender 1, therefore, the thickness of the hollow tapered body is gradually thickened from the fastening portion 3 toward the shock-receiving portion 2. Moreover, a thickness t of each support corner part 4a in the support portion 4 at a position of the shock-receiving base 5 is set to be $0.16H≦t≦0.24H$.

Figure 5:
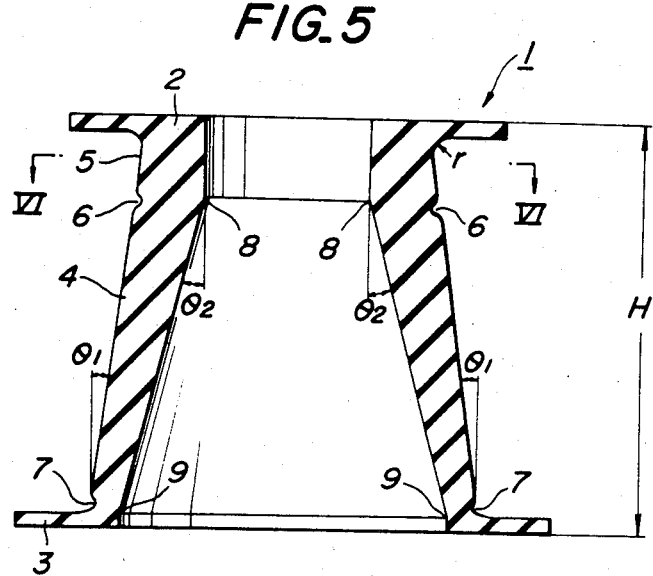
FIG. 5 is a longitudinally sectional view of an embodiment of the marine fender according to the invention.

As shown in FIG. 5, a curved part having a curvature r of 0.03H–0.05H is formed in the outer surface of the marine fender 1 at the shock-receiving portion 2 above the shock-receiving base 5.

When the inner surface of the marine fender or the hollow tapered portion 1 has a truncated pyramidal form instead of the truncated conical form, if each of the support corner parts has a certain angle, stress concentrates in the support corner part and durability may be deteriorated. Therefore, it is preferable that the support corner part has a certain curvature R. However, if the curvature R is too large, the thickness of the support corner part is too thick and hence the deformation amount against compression becomes small. Considering the above, the optimum range of the curvature R is $0.08H≦R≦0.12H$.

Figure 6:
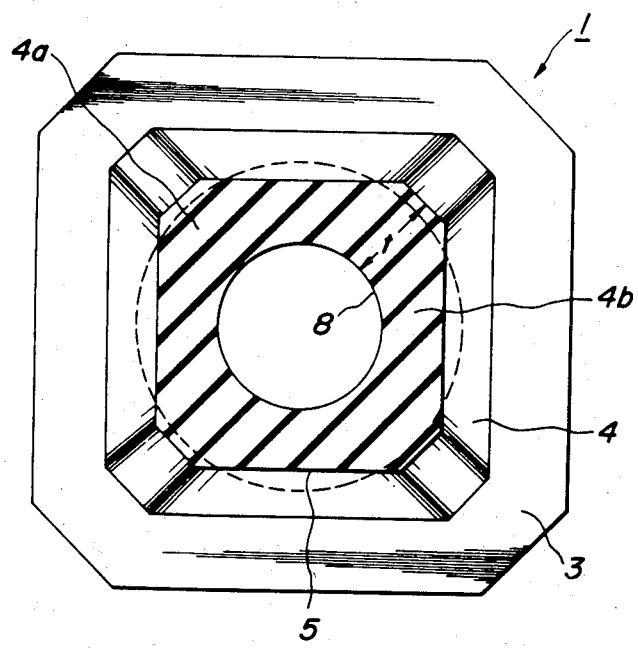
FIG. 6 is a transversely plan view taken along a line VI—VI of FIG. 5.

In the use of the marine fender 1 having the structure as shown in FIGS. 5 and 6, the fastening portion 3 is fixed to a quay wall or the like (not shown) by means of bolts and nuts (not shown), while a shock receiving member (not shown) comprising a latticed assembly of I-beams and a shock-receiving pad made of a synthetic resin and adhered thereto is bonded to the shock-receiving portion 2.

Figure 7A:
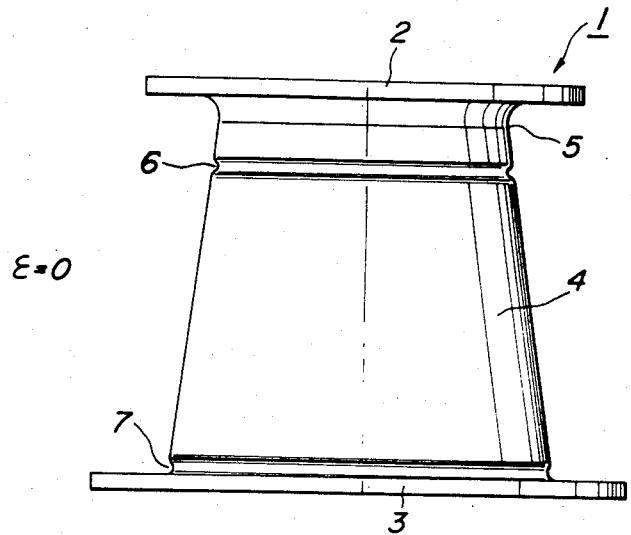
Figure 7B:
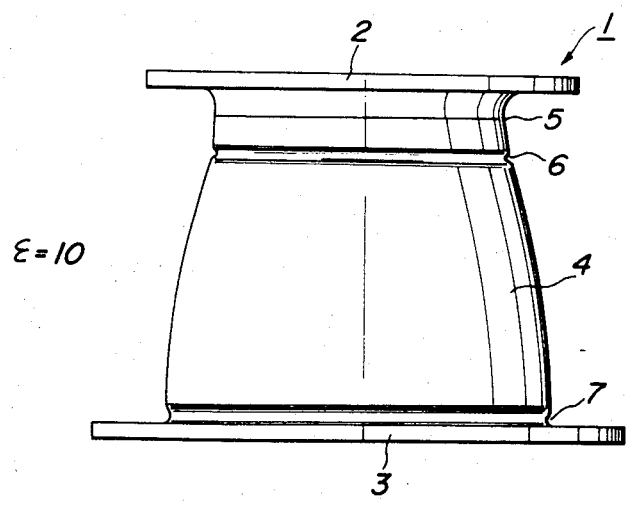
Figure 7E:
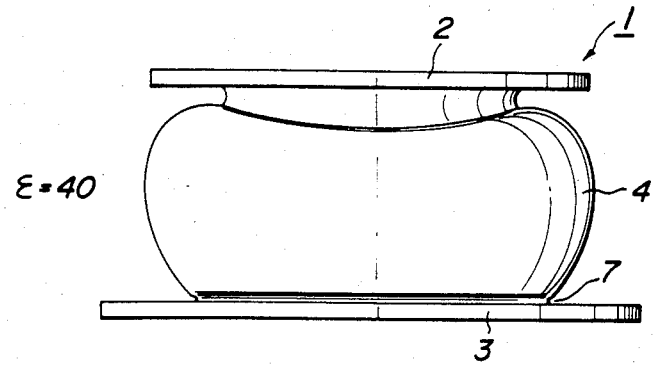
Figure 7F:
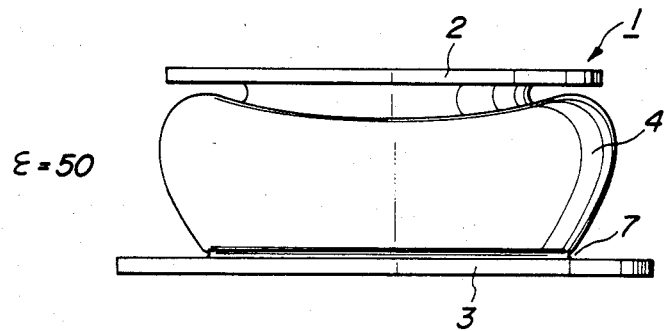
Figure 7G:
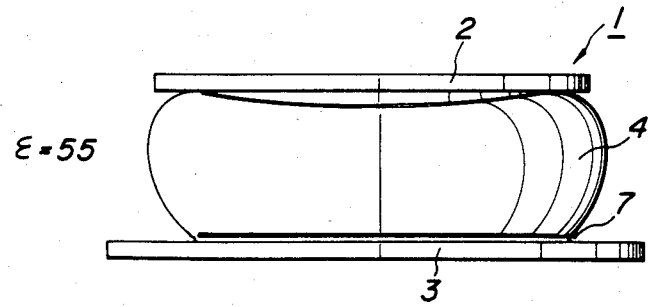

When shock loading is applied to the marine fender 1 through the shock-receiving member in the berthing of the vessel, the marine fender 1 is deformed as shown in FIGS. 7A to 7G, wheren FIG. 7A is the case of $\epsilon=0$, FIG. 7B is the case of $\epsilon=10$, FIG. 7C is the case of $\epsilon=20$, FIG. 7D is the case of $\epsilon=30$, FIG. 7E is the case of $\epsilon=40$, FIG. 7F is the case of $\epsilon=50$, and FIG. 7G is the case of $\epsilon=55$ when the deformation state of the marine fender 1 is shown by the strain $\epsilon$ of the marine fender 1 as a parameter. The strain $\epsilon$ is represented by the equation of $\epsilon=(\Delta H/H \times 100(\%)$, wherein $\Delta H$ is a deformation amount of the marine fender 1 subjected to the shock loading.

As apparent from FIGS. 7A to 7G, when the strain $\epsilon$ is as small as about 10, the upper groove 6 is not still broken, but when the strain $\epsilon$ is more than 20, the upper groove 6 is broken to closely contact the opposed walls with each other and the support portion 4 begins to bulge outward.

Four corner parts 4a of the support portion 4 have a thickness thicker at a proper ratio than that of the remaining central part 4b, so that the resistance to bending deformation in the corner part 4a along a plane in parallel with the shock-receiving portion 2 or the bending rigidity of the corner part 4a is not so large. Therefore, when the strain $\epsilon$ changes from 20 to 30 after the beginning of outwardly buldging deformation of the support portion 4, all of the four central parts 4b cause the bulging deformation without alternately bulging and denting as shown in FIG. 4 to prevent the rapid reduction of compressive spring constant of the marine fender 1, whereby the shock energy can sufficiently be absorbed.

When the strain ε increases to 40–50 as shown in FIGS. 7E and 7F, the support portion 4 further bulges outwardly between the upper groove 6 and the fastening portion 3. On the other hand, a part of the support portion 4 extending between the upper groove 6 and the shock-receiving portion 2 does not cause the outwardly bulging deformation, so that the support portion 4 begins to cause buckling about the upper groove 6 as a boundary and consequently the shock-receiving portion 2 above the upper groove 6 gradually sinks in the inside of the outwardly bulged support portion 4.

Further, when the strain ε reaches 55, as shown in FIG. 7G, the outer surface of each corner part 4a of the support portion 4 comes into contact with the lower surface of the shock-receiving portion 2, while there is created a gap between the outer surface of the central part 4b and the lower surface of the shock-receiving portion 2. In this case, the outer surface of the support portion 4 tapered inward at the inclination angle $\theta_1$ changes into an outwardly opposite inclination through vertical at a base of the support portion 4 having a thin thickness as the bulging deformation of the support portion 4 proceeds in accordance with the increase of compression loading, whereby the rapid reduction of compressive spring constant due to the buckling can be suppressed.

In the illustrated embodiment, since the thickness of the support portion 4 is gradually thickened from the fastening portion 3 toward the shock-receiving portion 2, even if the outer surface of the support portion 4 is tapered inward, the sectional area of the support portion 4 cut at a plane in parallel with the shock-receiving portion 2 does not change so much in the longitudinal direction and is approximately settled. As a result, the compression strain against compression loading can be retained substantially uniformly over the longitudinal entire length of the marine fender 1 to effectively absorb the shock energy.

Further, buckling deformation of the support portion 4 is smoothly caused between the upper and lower grooves 6 and 7 formed on the outer surface of the marine fender 1, so that the buckling length (l) can be shortened to considerably increase the buckling load Pc. Therefore, the shock absorbing energy can largely be increased from the compression elastic deformation region to the buckling deformation region through the buckling transition region.

In the illustrated embodiment, since all of the central parts 4b in the support portion 4 produce the outwardly bulging deformation, the shock buffering force can be obtained stably. Further, since the thickness of the support portion 4 slowly changes in the circumferential direction, the stress concentration is avoided to reduce the fatigue due to the local stress concentration and to improve the durability.

In the marine fender of FIGS. 5 to 7, the shock-receiving portion 2 is adjacent to the tapered end of the support portion 4 and the fastening portion 3 is adjacent to the base of the support portion 4. However, the position of the shock-receiving portion and the fastening portion may be reversed to the case of FIGS. 5 to 7.

Although the inner surface of the support portion 4 is inclined at the same angle $\theta_2$ in the illustrated embodiment, as shown in FIG. 8, it may be inclined at an angle $\theta_3$ smaller by 1°–2° than the angle $\theta_2$ over a region extending from the fastening portion 3 to a position of 0.3H.

Figure 9:
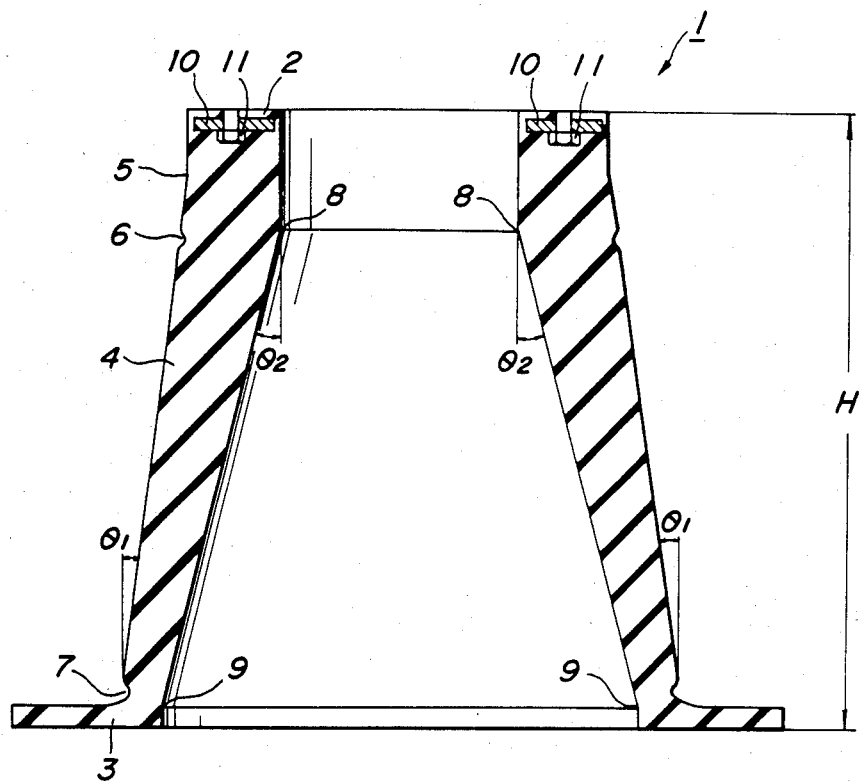

In the illustrated embodiments of FIGS. 5 and 8, the shock-receiving portion 2 integrally united with the support portion 4 is provided with a flange protruding outwardly from the support portion 4. As shown in FIG. 9, a perforated iron plate 10 bonded with a nut 11 may completely be embedded in the shock-receiving portion 2 having no flange and a shock receiving member (not shown) may be attached to the shock-receiving portion 2 through nuts 11 and bolts (not shown). Alternatively, the perforated iron plate 10 may be embedded in the shock-receiving portion 2 at the same level on the outer surface of the shock-receiving portion 2, or a bolt may be bonded to the perforated iron plate 10 instead of the nut 11.

In the embodiment of FIG. 9, the flange is removed from the shock-receiving portion 2, so that the outer surface of the marine fender 1 never contacts with the flange and consequently the compressive spring constant of the marine fender 1 does not increase rapidly, whereby the buffering performance in the berthing of the vessel is further improved.

What is claimed is:

1. A marine fender comprising; a hollow tapered body of an elastic material having a relatively small elastic coefficient, said body having a shock-receiving side and a fastening side; the thickness of the hollow tapered body gradually thickened from the shock-receiving side toward the fastening side, said hollow tapered body provided at its outer periphery with a groove formed at a given position near the shock-receiving side, and said hollow tapered body having a truncated octapyramidal form at its outer surface and a truncated conical form at its inner surface.

2. A marine fender comprising; a hollow tapered body of an elastic material having a relatively small elastic coefficient; said body having a shock-receiving side and a fastening side; the thickness of the hollow tapered body gradually thickened from the fastening side toward the shock-receiving side, and the hollow tapered body provided at its outer periphery with a groove formed at a given position near the shock-receiving side end, and; said hollow tapered body having a truncated octapyramidal form at its outer surface and a truncated conical form at its inner surface.

3. The marine fender according to claim 1, wherein said elastic material is rubber.

4. The marine fender according to claim 1, wherein said hollow tapered body is tapered at an inclination angle of 9°±2° with respect to normal line at the outer surface and at an inclination angle of 12.5°±2.5° with respect to normal line at the inner surface.

5. The marine fender according to claim 1, wherein said groove is formed in the outer surface of said hollow tapered body at a position corresponding to 0.2H from the surface of the shock-receiving side end, in which H is a distance between the upper surface and the lower surface of said hollow tapered body and has a semicircle in section having a radius of 0.01H–0.015H.

6. The marine fender according to claim 1, wherein said hollow tapered body is further provided at the outer surface with a groove formed at a position corresponding to 0.1H from the surface of the fastening side end, in which H is a distance between the upper surface and the lower surface of said hollow tapered body, and having a semicircle in section having a radius of 0.01H–0.015H.

7. The marine fender according to claim 2, wherein said elastic material is rubber.

8. The marine fender according to claim 2, wherein said hollow tapered body is tapered at an inclination angle of 9°±2° with respect to normal line at the outer surface and at an inclination angle of 12.5°±2.5° with respect to normal line at the inner surface.

9. The marine fender according to claim 2, wherein said groove is formed in the outer surface of said hollow tapered body at a position corresponding to 0.2H from the surface of the shock-receiving side end, in which H is a distance between the upper surface and the lower surface of said hollow tapered body and has a semicircle in section having a radius of 0.01H–0.015H.

10. The marine fender according to claim 2, wherein said hollow tapered body is further provided at the outer surface with a groove formed at a position corresponding to 0.1H from the surface of the fastening side end, in which H is a distance between the upper surface and the lower surface of said hollow tapered body, and having a semicircle in section having a radius of 0.01H–0.015H.

* * * * *